US007700048B2

(12) United States Patent
Jiang et al.

(10) Patent No.: US 7,700,048 B2
(45) Date of Patent: Apr. 20, 2010

(54) APPARATUS FOR MAKING CARBON NANOTUBE ARRAY

(75) Inventors: Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 886 days.

(21) Appl. No.: 11/371,992

(22) Filed: Mar. 8, 2006

(65) Prior Publication Data

US 2006/0263274 A1 Nov. 23, 2006

(30) Foreign Application Priority Data

Mar. 25, 2005 (CN) .................... 2005 1 0033857

(51) Int. Cl.
*B01J 10/00* (2006.01)
*B01J 19/00* (2006.01)
*D01F 9/12* (2006.01)

(52) U.S. Cl. .................... 422/129; 422/198; 423/447.2; 423/447.3

(58) Field of Classification Search ................ 422/129, 422/198, 199, 232; 423/447.2, 447.3
See application file for complete search history.

(56) References Cited

U.S. PATENT DOCUMENTS

| 4,572,813 | A   | * | 2/1986  | Arakawa ............... 264/29.2 |
| 5,374,415 | A   | * | 12/1994 | Alig et al. ............. 423/447.3 |
| 5,849,360 | A   | * | 12/1998 | Huang et al. .......... 427/249.19 |
| 6,177,292 | B1  | * | 1/2001  | Hong et al. ............ 438/46 |
| 6,221,330 | B1  | * | 4/2001  | Moy et al. ............. 423/447.3 |
| 6,232,706 | B1  |   | 5/2001  | Dai et al. |
| 6,315,977 | B1  |   | 11/2001 | Cantacuzene |
| 6,350,488 | B1  | * | 2/2002  | Lee et al. ............... 427/249.1 |
| 6,569,765 | B1  | * | 5/2003  | Solomon et al. ........ 438/680 |
| 6,627,552 | B1  | * | 9/2003  | Nishio et al. ........... 438/694 |
| 6,656,285 | B1  | * | 12/2003 | Melnik et al. .......... 118/726 |
| 6,706,119 | B2  | * | 3/2004  | Tsvetkov et al. ........ 118/719 |
| 6,768,135 | B2  | * | 7/2004  | Solomon et al. ........ 257/96 |
| 6,800,369 | B2  | * | 10/2004 | Gimzewski et al. ..... 428/408 |
| 6,936,357 | B2  | * | 8/2005  | Melnik et al. .......... 428/698 |
| 7,214,360 | B2  |   | 5/2007  | Chen et al. |

(Continued)

FOREIGN PATENT DOCUMENTS

CN       1266018       9/2000

OTHER PUBLICATIONS

Li, W Z et. al., Large-scale synthesis of aligned carbon nanotubes, Science, 274, 1701-1703.

(Continued)

*Primary Examiner*—Walter D Griffin
*Assistant Examiner*—Huy-Tram Nguyen
(74) *Attorney, Agent, or Firm*—Clifford O. Chi

(57) ABSTRACT

An apparatus for making an array of carbon nanotubes includes a reaction chamber and a quartz-boat region. The reaction chamber having a first gas inlet configured for introducing a carbon source gas and a carrier gas thereinto, a second gas inlet configured for introducing a hydrogen gas thereinto, a guiding tube in communication with the second gas inlet, and a gas outlet. The quartz-boat region configured for accommodating a quartz boat for supporting a substrate; wherein the guiding tube extends inwardly a distance sufficient to enable the majority of the introduced hydrogen gas that reaches the substrate not to react with the carbon source gas.

20 Claims, 2 Drawing Sheets

U.S. PATENT DOCUMENTS

| | | | |
|---|---|---|---|
| 7,276,121 B1* | 10/2007 | Bliss et al. | 118/715 |
| 7,279,047 B2* | 10/2007 | Melnik et al. | 118/719 |
| 7,288,321 B2 | 10/2007 | Liu et al. | |
| 7,374,731 B2* | 5/2008 | Wang et al. | 422/198 |
| 2002/0124965 A1* | 9/2002 | Shibata et al. | 156/345.52 |
| 2002/0132495 A1 | 9/2002 | Siegel et al. | |
| 2002/0172767 A1 | 11/2002 | Grigorian et al. | |
| 2003/0039750 A1* | 2/2003 | Mao et al. | 427/180 |
| 2004/0053053 A1 | 3/2004 | Jiang et al. | |
| 2004/0105807 A1 | 6/2004 | Fan et al. | |
| 2004/0132298 A1* | 7/2004 | Shibata et al. | 438/689 |
| 2004/0136896 A1 | 7/2004 | Liu et al. | |
| 2004/0253167 A1 | 12/2004 | Silva et al. | |
| 2005/0046322 A1 | 3/2005 | Kim et al. | |
| 2005/0053542 A1* | 3/2005 | Harutyunyan | 423/447.3 |
| 2005/0089467 A1 | 4/2005 | Grill et al. | |
| 2005/0112051 A1 | 5/2005 | Liu et al. | |
| 2005/0238566 A1* | 10/2005 | Rao et al. | 423/447.3 |
| 2005/0271829 A1 | 12/2005 | Kumar et al. | |
| 2006/0269669 A1 | 11/2006 | Jiang et al. | |
| 2007/0092430 A1* | 4/2007 | Hsiao | 423/447.3 |
| 2007/0237694 A1* | 10/2007 | Hsiao et al. | 422/220 |

OTHER PUBLICATIONS

Moshkalyov et al., Carbon nanotubes growth by chemical vapor deposition using thin film nickel catalyst, Sep. 25, 2004, Materials Science and Engineering B, vol. 112, Issues 2-3, pp. 147-153.

Cassell et al., Large scale CVD synthesis of Single Walled Carbon Nanotubes, Jun. 1. 1999, J. Phys. Chem. B 103, 6484-6492.

* cited by examiner

APPARATUS FOR MAKING CARBON NANOTUBE ARRAY

RELATED APPLICATIONS

This application is related to commonly-assigned copending application Ser. No. 11/371,989 entitled, "METHOD FOR MAKING CARBON NANOTUBE ARRAY", filed Mar. 8, 2006, Ser. No. 11/371,997 "APPARATUS AND METHOD FOR MAKING CARBON NANOTUBE ARRAY", filed Mar. 8, 2005, and Ser. No. 11/371,993 "METHOD FOR MAKING CARBON NANOTUBE ARRAY", filed Mar. 8, 2006. Disclosures of the above identified applications are incorporated herein by reference.

BACKGROUND

1. Technical Field

The invention relates generally to apparatus for making carbon nanotubes, and more particularly to an apparatus for making an array of carbon nanotubes.

2. Discussion of Related Art

Carbon nanotubes were discovered by S. Iijima in 1991, they are very small tube-shaped structures, each essentially having composition similar to that of a graphite sheet rolled into a tube. Theoretical studies showed that carbon nanotubes exhibit either metallic or semiconductive behavior depending on the radii and helicity of the tubules. Carbon nanotubes have interesting and potentially useful electrical and mechanical properties, and have many potential uses in electronic devices. Carbon nanotubes also feature extremely high electrical conductivity, very small diameters (much less than 100 nanometers), large aspect ratios (i.e. length/diameter ratios greater than 1000), and a tip-surface area near the theoretical limit (the smaller the tip-surface area, the more concentrated the electric field, and the greater the field enhancement factor). These features make carbon nanotubes ideal candidates for electron field emitters, white light sources, lithium secondary batteries, hydrogen storage cells, transistors, and cathode ray tubes (CRTs).

Generally, there are three methods for manufacturing carbon nanotubes. The first method is the arc discharge method, which was first discovered and reported in an article by Sumio Iijima entitled "Helical Microtubules of Graphitic Carbon" (Nature, Vol. 354, Nov. 7, 1991, pp. 56-58). The second method is the laser ablation method, which was reported in an article by T. W. Ebbesen et. al. entitled "Large-scale Synthesis of Carbon Nanotubes" (Nature, Vol. 358, 1992, pp. 220). The third method is the chemical vapor deposition (CVD) method, which was reported in an article by W. Z. Li entitled "Large-scale Synthesis of Aligned Carbon Nanotubes" (Science, Vol. 274, 1996, pp. 1701).

In the arc discharge method, a carbon vapour is created by an arc discharge between two carbon electrodes with or without catalyst. Carbon nanotubes self-assemble from the resulting carbon vapour. In the laser ablation technique, high-powered laser pulses impinge on a volume of carbon-containing feedstock gas (methane or carbon monoxide). Carbon nanotubes are thus condensed by the laser ablation and are deposited on an outside collector. However, the carbon nanotubes produced by the arc discharge and the laser ablation vary greatly in diameter and length, with little control over the dimensions of the resulting product. Moreover, poor carbon nanotube yield and prohibitive cost involved in making the device mean that the two methods difficult to scale up to suit industrial production.

In the chemical vapour deposition (CVD) method, carbon filaments and fibers are produced by thermal decomposition of a hydrocarbon gas on a transition metal catalyst in a chemical vapour deposition reaction chamber. In general, the chemical vapour deposition process results in both multi-walled nanotubes (MWNTs) and single-walled nanotubes (SWNTs) being produced. Compared with the arc discharge method and laser ablation method, the chemical vapour deposition method is a more a simple process and can easily be scaled up for industrial production. However, the carbon nanotubes manufactured by the chemical vapour deposition process aren't bundled to form an array, thus the CVD process can't assure both quantity and quality of production.

In view of the above, another method, such as a thermal chemical vapor deposition method is disclosed where an array of carbon nanotubes are formed vertically aligned on a large-size substrate. The thermal CVD method includes the steps of: forming a metal catalyst layer on a substrate; etching the metal catalyst layer to form isolated nano-sized catalytic metal particles; growing carbon nanotubes from said isolated nano-sized catalytic metal particles by the thermal chemical vapor deposition (CVD) process; and purifying the carbon nanotubes in-situ.

The carbon nanotubes formed by the above-described methods are vertically aligned on the substrate. However, the devices used in above-described method are complicated. Several gas inlets are disposed in the device for introducing different gas. Also the carbon nanotubes formed in the above-described devices are generally comprised of a mix of MWNTs and SWNTs. The mixed carbon nanotubes do not sufficiently exhibit the useful properties of a single-type array of carbon nanotubes. Furthermore, excess amorphous carbon lumps and metal catalyst lumps are also produced along with the carbon nanotubes formed by the above-described devices and adhere to inner or outer sidewalls of the carbon nanotubes. Thus, a complicated purification device is required in addition to the above-described devices. Moreover, the devices used in the above-described method generally operate at temperatures in the range from 700° C. to 1000° C. for growing carbon nanotubes, thus requiring a highly heat-resistant reaction chamber. Therefore, the devices in the above-described method for making the carbon nanotubes are limited.

What is needed, therefore, is a device for making an array of carbon nanotubes that is easy to operate, and has a simple structure for making arrays of high-purity carbon nanotubes.

SUMMARY

An apparatus for making an array of carbon nanotubes includes a reaction chamber and a quartz-boat region. The reaction chamber having a first gas inlet configured for introducing a carbon source gas and a carrier gas thereinto, a second gas inlet configured for introducing a hydrogen gas thereinto, a guiding tube in communication with the second gas inlet, and a gas outlet. The quartz-boat region configured for accommodating a quartz boat for supporting a substrate; wherein the guiding tube extends inwardly a distance sufficient to enable the majority of the introduced hydrogen gas that reaches the substrate not to react with the carbon source gas.

The quartz boat is disposed in the reaction chamber, the quartz boat has an obliquely oriented portion for accommodating the substrate. The reaction chamber is substantially tubular in shape. The carrier gas includes at least one of the noble gases or nitrogen gas. The carbon source gas is selected from the group consisting of ethylene, methane, acetylene, ethane, and any combination thereof.

Compared with conventional CVD devices for making carbon nanotube arrays, the device in the described embodiments has the following advantages. Firstly, the present apparatus can perform at a relatively low temperature, for example, in the range from 600 to 700° C. In the preferred embodiment of the apparatus, an array of bundled and super-aligned carbon nanotubes can be synthesized at temperatures in the range from 620 to 690° C. Secondly, growth speed and yield of carbon nanotubes are both improved. After growing carbon nanotubes for 30 to 60 minutes, the carbon nanotube array has a height of a few hundred micrometers to a few millimeters. Thirdly, the present apparatus and method for growing carbon nanotubes is inexpensive. A carrier gas and a carbon source gas of the preferred method can be inexpensive argon and acetylene. A catalyst can be inexpensive iron.

Other advantages and novel features of the present apparatus for making an array of carbon nanotubes will become more apparent from the following detailed description of preferred embodiments, when taken in conjunction with the accompanying drawings.

BRIEF DESCRIPTION OF THE DRAWINGS

Many aspects of the present device can be better understood with reference to the following drawings. The components in the drawings are not necessarily to scale, the emphasis instead being placed upon clearly illustrating the principles of the present device for making an array of carbon nanotubes.

Figure 1:
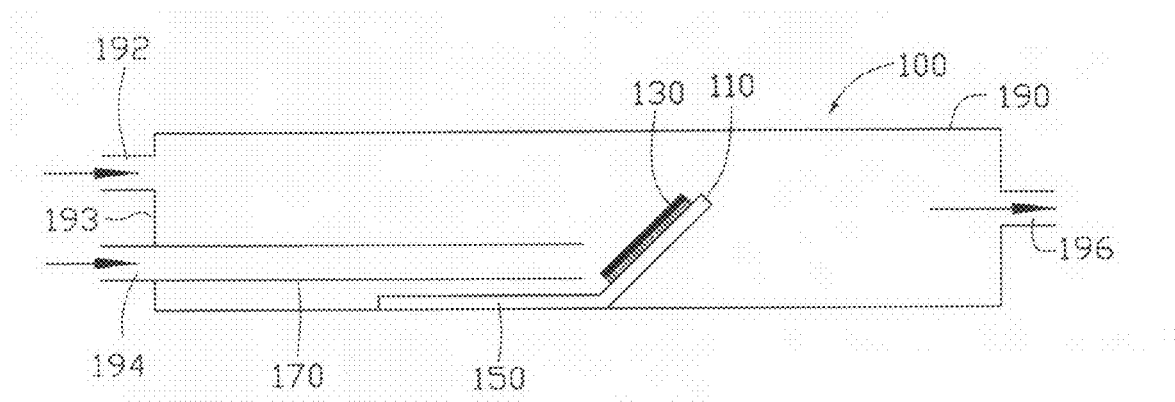
FIG. 1 is a schematic view of an apparatus for making an array of carbon nanotubes in accordance with a preferred embodiment of the present invention.

Corresponding reference characters indicate corresponding parts throughout the several views. The exemplifications set out herein illustrate at least one preferred embodiment of the present device for making an array of carbon nanotubes in one form, and such exemplifications are not to be construed as limiting the scope of the invention in any manner.

DETAILED DESCRIPTION OF PREFERRED EMBODIMENTS

Reference will now be made to the drawings to describe embodiments of the present device for making an array of carbon nanotubes, in detail.

Referring to FIG. 1, an apparatus 100 in accordance with one embodiment of the present device is provided. The apparatus 100 includes a reaction chamber 190, a gas introducing device 170, a quartz boat 150, a substrate 110, and a catalyst 130. The reaction chamber 190 can be a tubular container. A first gas inlet 192 and a second gas inlet 194 are located at one end of the reaction chamber 190. A partition wall 193 of the reaction chamber 190 is located between the first gas inlet 192 and the second gas inlet 194. The partition wall 193 separates the first gas inlet 192 and the second gas inlet 194. A gas outlet 196 is located at the other opposite end of the reaction chamber 190. In the preferred embodiment, the first gas inlet 192 is for introducing a carrier gas and a carbon source gas. The second gas inlet 194 is for introducing hydrogen gas. The partition wall 193 is configured for separately introducing the carrier gas and the carbon source gas, and the hydrogen gas. The gas introducing device 170 can be a quartz tube with two open ends. The outer open end of the gas introducing device 170 is connected to the second gas inlet 194, and the inner open end of the gas introducing device 170 extends into the reaction chamber 190. The quartz boat 150 is disposed in the reaction chamber 190. The quartz boat 150 includes a horizontal portion and an oblique portion. The oblique portion is configured to be inclined at an oblique angle relative to the horizontal portion. The substrate 110 is disposed on the oblique portion of the quartz boat 150. Therefore, the substrate 10 is obliquely oriented relative to the horizontal direction. A surface of the substrate 110 is disposed as close as possible to the inner open end of the gas introducing device 170, facing the inner open end of the introducing device 170. The film of catalyst 130 is uniformly disposed on the surface of the substrate 110 by means of chemical vapor deposition, thermal deposition, electron-beam deposition, or sputtering. The catalyst 130 can be made of iron (Fe), cobalt (Co), nickel (Ni), or any combination alloy thereof In the preferred embodiment, the catalyst 130 is made of iron.

It is to be noted that the shape of the quartz boat 150 of the present apparatus can be varied depending on different situations. The place where the substrate 110 with the catalyst 130 is disposed is related to the shape of the quartz boat 150. For example, when the quartz boat 150 is cymbiform, the substrate 110 is disposed as close as possible to the gas introducing device 170. Furthermore, because the purpose of the gas introducing device 170 in the present device is for providing additional hydrogen gas flow directly onto the catalyst 130, the catalyst 130 formed on the substrate 110 should be disposed beside the inner open end of the gas introducing device 170 to ensure that the hydrogen can act on the catalyst 130 directly. Also, it is to be understood that free places of the substrate 110 with catalyst 130 is in the range of protection for the present invention.

Furthermore, the structure of gas introducing device 170 of the present apparatus can be varied. For example, the gas introducing device can be comprised of many gas introducing tubes introducing gas onto a correspondingly large number of quartz boats.

A preferred method for making an array of carbon nanotubes using the present apparatus is provided. The method includes the following steps. Firstly, a substrate 110 with a surface is provided, and a film of catalyst 130 is formed on the surface of the substrate 110. The film of catalyst 130 is uniformly deposited on the substrate 110 by means of chemical vapor deposition, thermal deposition, electron-beam deposition, or sputtering.

Secondly, a quartz boat 150 is provided. The quartz boat 150 includes a horizontal portion and an oblique portion. The oblique portion is configured to be inclined at an oblique angle relative to the horizontal portion. The substrate 110 is disposed on the oblique portion of the quartz boat 150. Therefore, the substrate 10 is obliquely oriented relative to the horizontal direction.

Thirdly, a horizontal reaction chamber 190 with a first gas inlet 192, a second gas inlet 194 and a gas outlet 196 is provided. A gas introducing device 170 with two open ends is disposed in the reaction chamber 190. The outer open end of the gas introducing device 170 is connected to the second gas inlet 194, and the inner open end of the gas introducing device 170 extends into the reaction chamber 190. The quartz boat 150 with the substrate 110 is disposed on a bottom of the reaction chamber 190. The surface of the substrate 110 with the catalyst 130 is disposed as close as possible to the gas introducing device 170, facing to the open inner end of the introducing device 170 so that a greater amount, and preferably the majority, of the introduced hydrogen gas that reaches the substrate does not react with the carbon source gas.

Fourthly, a carrier gas is continuously introduced into the reaction chamber 19 from the first gas inlet 192 at one atmosphere of pressure. The carrier gas is used to create an atmosphere of inert gas in the reaction chamber 19. Then, the reaction chamber 18 is heated gradually to a predetermined temperature depending on various situations. A carbon source gas which mixes with the carrier gas is introduced into the reaction chamber 190 from the first gas inlet 192, and simultaneously, hydrogen gas is introduced into the reaction chamber 190 from the second gas inlet 194 so that the majority of the introduced hydrogen gas that reaches the substrate does not react with the carbon source gas. The carrier gas can be a nitrogen ($N_2$) gas or a noble gas. The carbon source gas can be ethylene ($C_2H_4$), methane ($CH_4$), acetylene ($C_2H_2$), ethane ($C_2H_6$) or any combination thereof In the preferred embodiment, the carrier gas is argon (Ar), the carbon source gas is acetylene, and at least 65 percent or more of the introduced hydrogen gas that reaches the substrate does not react with the carbon source gas. The argon flow-rate is in the range from 100 to 1000 sccm (Standard Cubic Centimeters per Minute), the acetylene flow-rate is in the range from 5 to 30 sccm, and a flow rate of hydrogen is in the range form 100 to 500 sccm. In the preferred embodiment, the flow rate of the argon is 300 sccm, and the flow rate of the hydrogen is 100 sccm. The predetermined temperature of the method can be in the range from 600 to 720° C. In the preferred embodiment, the predetermined temperature is in the range from 620 to 690° C.

Due to catalyzing by the catalyst 130, the carbon source gas supplied into the reaction chamber 190 is pyrolized in a gas phase into carbon units (C=C or C) and free hydrogen ($H_2$). The carbon units are absorbed on a free surface of the catalyst 130 and diffused into the catalyst 130. When the catalyst 130 is supersaturated with the dissolved carbon units, carbon nanotube growth is initiated. As the intrusion of the carbon units into the catalyst 130 continue, an array of carbon nanotubes is formed. The carbon nanotube array formed by the preferred embodiment is a multi-walled carbon nanotube array. Density, diameter and length of the multi-walled carbon nanotube array can be controlled by adjusting the flow rates of the carbon source gas and the carrier gas, and by altering the predetermined temperature and the reaction time. In addition, the hydrogen introduced by the second gas inlet can flow to the substrate, and act on the catalyst directly. That is, the hydrogen can avoid reaction with the carbon source gas, and the catalyst can be activated directly by the hydrogen. In this way, the growth speed of the carbon nanotubes is increased and the height of the carbon nanotube array is enhanced. In the preferred first embodiment, the reaction time is in the range from 30 to 60 minutes. The synthesis method can produce carbon nanotubes with a length greater than 3-400 micrometers, and have a diameter in the range from 10 to 30 nanometers.

Figure 2:
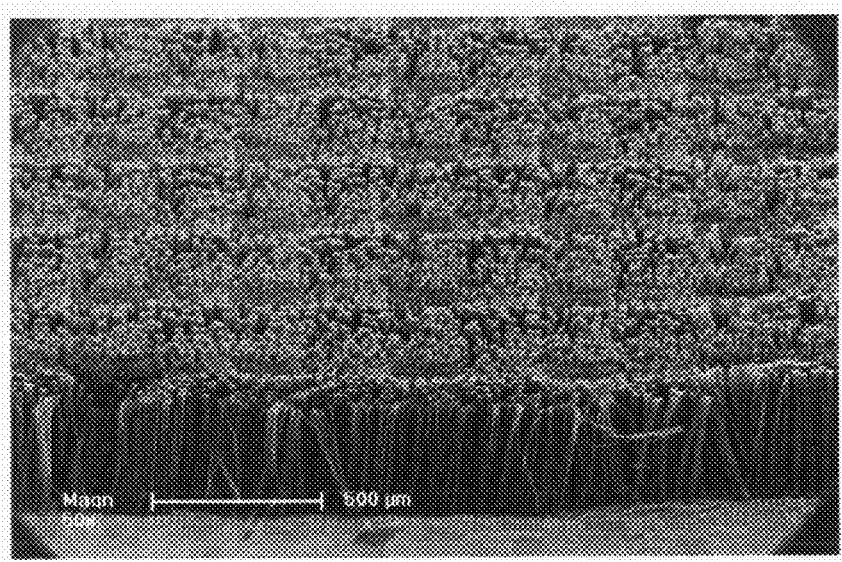
FIG. 2 shows a Scanning Electron Microscope (SEM) image of the array of carbon nanotubes formed by the apparatus of FIG. 1.
Figure 3:
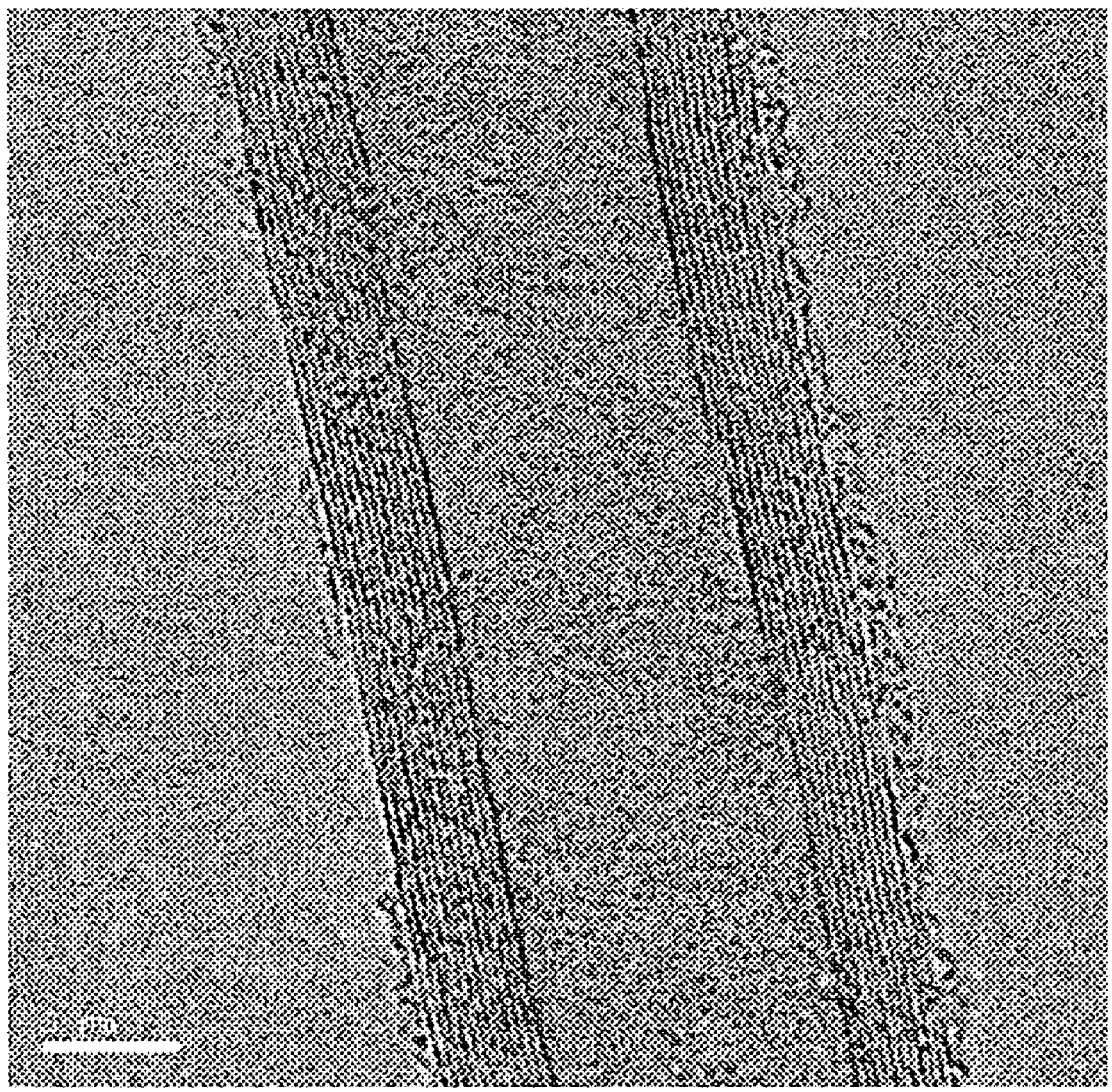
FIG. 3 shows a Transmission Electron Microscope (TEM) image of the array of carbon nanotubes formed by the apparatus of FIG. 1.

Referring to FIGS. 2 and 3, a SEM image and a TEM image of the multi-walled carbon nanotube array formed by the present apparatus are shown. It can be seen that the carbon nanotubes in the carbon nanotube array are highly bundled and super-aligned. The height of the carbon nanotube array is about 300 micrometers.

It is noted that, the reaction chamber of the present apparatus includes apparatuses for use in chemical vapor deposition, such as horizontal CVD devices, vertical CVD devices and a CVD device with a removable quartz boat. Moreover, the reaction chamber of the present apparatus isn't limited to having two gas inlets. It is understood that a free reaction chamber with a gas inlet connected with a gas introducing device for introducing hydrogen to catalyst directly would be consider to be within the scope of the present invention. Furthermore, the present apparatus can be utilized to synthesize large amounts of carbon nanotube arrays by disposing a plurality of substrate in the reaction chamber with a plurality of gas introducing devices, each, gas introducing device corresponding to its respective substrate. The properties of the carbon nanotubes are essentially uniform, thus, both quality and production of the carbon nanotubes can be controlled by the present apparatus. Furthermore, the film of catalyst of the device adopted in the present apparatus can be patterned for growing patterned carbon nanotube arrays.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

We claim:

1. An apparatus for making an array of carbon nanotubes, comprising:
    a reaction chamber having a first gas inlet, a carbon source gas and a carrier gas being introduced via the first gas inlet, a second gas inlet, a hydrogen gas being introduced via the second gas inlet, a guiding tube in communication with the second gas inlet, and a gas outlet; and
    a quartz-boat region accommodating a quartz boat for supporting a substrate; wherein the guiding tube extends inwardly a distance sufficient to enable the majority of the introduced hydrogen gas that reaches the substrate not to react with the carbon source gas introduced via the first gas inlet.

2. The apparatus as claimed in claim 1, wherein the guiding tube comprises of quartz.

3. The apparatus as claimed in claim 1, further comprising the quartz boat disposed in the reaction chamber, the quartz boat having an obliquely oriented portion for accommodating the substrate.

4. The apparatus as claimed in claim 3, wherein the substrate is obliquely oriented relative to the length of the reaction chamber.

5. The apparatus as claimed in claim 3, wherein the quartz boat is cymbiform.

6. The apparatus as claimed in claim 1, wherein the reaction chamber is substantially tubular in shape.

7. The apparatus as claimed in claim 1, wherein the carrier gas comprises at least one noble gas or nitrogen gas.

8. The apparatus as claimed in claim 1, wherein the carbon source gas is selected from the group consisting of ethylene, methane, acetylene, ethane, and any combination thereof.

9. The apparatus as claimed in claim 1, wherein a film of catalyst is uniformly located on a surface of the substrate by means of chemical vapor deposition, thermal deposition, electron-beam deposition, or sputtering.

10. The apparatus as claimed in claim 9, wherein the catalyst can be made of iron, cobalt, nickel, or any combination alloy thereof.

11. The apparatus as claimed in claim 1, wherein the first gas inlet and the second gas inlet are located at a first end of the reaction chamber, and the gas outlet is located at a second end of the reaction chamber, and the second end is opposite to the first end.

12. The apparatus as claimed in claim 1, wherein the guiding tube is without liquid material.

13. The apparatus as claimed in claim 1, wherein at least 65 percent of the introduced hydrogen gas that reaches the substrate does not react with the carbon source gas.

14. The apparatus as claimed in claim 1, wherein a partition wall of the reaction chamber is located between the first gas inlet and the second gas inlet.

15. An apparatus for making an array of carbon nanotubes, comprising:
- a reaction chamber having a first gas inlet, a carbon source gas and a carrier gas being introduced via the first gas inlet;
- a guiding tube, a hydrogen gas being introduced via the guiding tube;
- a gas outlet;
- a boat region; and
- a substrate with a catalyst;
- wherein the guiding tube has an opening close enough to the catalyst such that when the hydrogen gas is introduced, the majority of the hydrogen gas that flows through the opening will react with the catalyst on the substrate.

16. The apparatus as claimed in claim 15, wherein the substrate is obliquely oriented relative to the length of the reaction chamber.

17. The apparatus as claimed in claim 15, wherein the catalyst is a film formed on a surface of the substrate by means of chemical vapor deposition, thermal deposition, electron-beam deposition, or sputtering.

18. An apparatus for making an array of carbon nanotubes, comprising:
- a reaction chamber having a first gas inlet, a carbon source gas and a carrier gas being introduced via the first gas inlet;
- a second gas inlet, a hydrogen gas being introduced via the second gas inlet, a guiding tube in communication with the second gas inlet, the guiding tube is without liquid material;
- a gas outlet;
- a boat region; and
- a substrate with a catalyst;
- wherein the guiding tube has an opening close enough to the catalyst such that when the hydrogen gas is introduced, the majority of the hydrogen gas that flows through the opening will react with the catalyst, and the catalyst is activated directly by the hydrogen.

19. The apparatus as claimed in claim 18, wherein the substrate is obliquely oriented relative to the length of the reaction chamber.

20. The apparatus as claimed in claim 18, wherein the catalyst is a film formed on a surface of the substrate by means of chemical vapor deposition, thermal deposition, electron-beam deposition, or sputtering.

* * * * *